US011970000B2

(12) United States Patent
Mizuno et al.

(10) Patent No.: US 11,970,000 B2
(45) Date of Patent: Apr. 30, 2024

(54) LIQUID DISCHARGE APPARATUS, LIQUID DISCHARGE METHOD, AND STORAGE MEDIUM

(71) Applicants: Masahiro Mizuno, Kanagawa (JP); Mitsunobu Gohda, Kanagawa (JP)

(72) Inventors: Masahiro Mizuno, Kanagawa (JP); Mitsunobu Gohda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 17/455,085

(22) Filed: Nov. 16, 2021

(65) Prior Publication Data

US 2022/0169016 A1 Jun. 2, 2022

(30) Foreign Application Priority Data

Nov. 27, 2020 (JP) ................................ 2020-197560

(51) Int. Cl.
*B41J 2/045* (2006.01)
*B41J 11/00* (2006.01)

(52) U.S. Cl.
CPC ......... *B41J 2/04573* (2013.01); *B41J 11/008* (2013.01); *B41J 11/0095* (2013.01)

(58) Field of Classification Search
CPC .................................................. B41J 2/04573
See application file for complete search history.

(56) References Cited

U.S. PATENT DOCUMENTS

| | | | | |
|---|---|---|---|---|
| 2002/0081132 | A1 | 6/2002 | Miyamoto et al. | |
| 2002/0118235 | A1* | 8/2002 | Narazaki | B41J 2/04563 347/5 |
| 2002/0131804 | A1 | 9/2002 | Nakazawa et al. | |
| 2003/0039496 | A1 | 2/2003 | Miyamoto et al. | |
| 2003/0185608 | A1 | 10/2003 | Miyamoto et al. | |
| 2005/0174379 | A1 | 8/2005 | Nakazawa et al. | |
| 2011/0176851 | A1 | 7/2011 | Kuwana et al. | |
| 2013/0071169 | A1 | 3/2013 | Gouda et al. | |
| 2016/0325566 | A1* | 11/2016 | Kurane | B41J 11/0095 |
| 2017/0106647 | A1 | 4/2017 | Inoue | |

(Continued)

FOREIGN PATENT DOCUMENTS

| | | |
|---|---|---|
| JP | 2017-077726 | 4/2017 |
| JP | 2017-167130 | 9/2017 |
| JP | 2018-158573 | 10/2018 |

*Primary Examiner* — Shelby L Fidler
(74) *Attorney, Agent, or Firm* — IPUSA, PLLC

(57) ABSTRACT

A liquid discharge apparatus includes liquid discharge units, a first image capturing unit, a second image capturing unit, a detection unit, and a discharge determination unit. The liquid discharge units include a first liquid discharge unit and a second liquid discharge unit downstream from the first discharge unit in a moving direction of a recording medium. The first capturing unit captures a first image of the medium at a position corresponding to the first discharge unit. The second capturing unit captures a second image of the medium at a position corresponding to the second discharge unit. The detection unit detects a movement amount of the medium in the moving direction, based on the first image and the second image. The discharge determination unit determines a discharge timing of the second discharge unit with respect to discharge of the first discharge unit, based on the movement amount and a clock signal.

18 Claims, 9 Drawing Sheets

(56) References Cited

U.S. PATENT DOCUMENTS

| | | | |
|---|---|---|---|
| 2017/0165960 | A1 | 6/2017 | Sunaoshi et al. |
| 2017/0165961 | A1 | 6/2017 | Hayashi et al. |
| 2017/0182764 | A1 | 6/2017 | Nagasu et al. |
| 2017/0266954 | A1 | 9/2017 | Nagasu et al. |
| 2017/0266965 | A1* | 9/2017 | Gohda ................. B41J 2/04586 |
| 2018/0236794 | A1 | 8/2018 | Mizuno et al. |
| 2018/0270366 | A1 | 9/2018 | Sunaoshi et al. |
| 2018/0272694 | A1 | 9/2018 | Gohda et al. |
| 2018/0361766 | A1 | 12/2018 | Shirato et al. |
| 2019/0143675 | A1 | 5/2019 | Nagasu et al. |
| 2020/0171846 | A1 | 6/2020 | Hayashi et al. |
| 2020/0171854 | A1 | 6/2020 | Sunaoshi et al. |
| 2021/0023837 | A1 | 1/2021 | Nagasu et al. |

* cited by examiner

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2020-197560, filed on Nov. 27, 2020, in the Japan Patent Office, the entire disclosure of which is incorporated by reference herein.

BACKGROUND

Technical Field

Embodiments of the present disclosure relate to a liquid discharge apparatus, a liquid discharge method, and a storage medium storing program code.

Related Art

In the related art, liquid discharge apparatuses have been known in which a plurality of liquid discharge units discharge liquid to form an image on a recording medium.

There has been also known a configuration in which liquid discharge timing is adjusted based on an output signal of a rotary encoder disposed at a conveyance roller of a recording medium and a movement amount of the recording medium detected using sensors disposed at positions corresponding to a plurality of liquid discharge units.

SUMMARY

According to an embodiment of the present disclosure, there is provided a liquid discharge apparatus includes a plurality of liquid discharge units, a first image capturing unit, a second image capturing unit, a detection unit, and a discharge determination unit. The plurality of liquid discharge units discharge liquid to form an image on a recording medium. The plurality of liquid discharge units include a first liquid discharge unit and a second liquid discharge unit disposed downstream from the first liquid discharge unit in a moving direction of the recording medium. The first image capturing unit captures a first image of the recording medium at a position corresponding to the first liquid discharge unit. The second image capturing unit captures a second image of the recording medium at a position corresponding to the second liquid discharge unit. The detection unit detects a movement amount of the recording medium in the moving direction, based on the first image and the second image. The discharge determination unit determines a discharge timing of the second liquid discharge unit with respect to discharge of the first liquid discharge unit, based on the movement amount and a clock signal.

According to another embodiment of the present disclosure, there is provided a liquid discharge method to be executed by a liquid discharge apparatus including a plurality of liquid discharge units to discharge liquid to form an image on a recording medium. The plurality of liquid discharge units includes a first liquid discharge unit and a second liquid discharge unit disposed downstream from the first liquid discharge unit in a moving direction of the recording medium. The method includes: capturing a first image of the recording medium at a position corresponding to the first liquid discharge unit; capturing a second image of the recording medium at a position corresponding to the second liquid discharge unit; detecting a movement amount of the recording medium in the moving direction, based on the first image and the second image; and determining a discharge timing of the second liquid discharge unit with respect to discharge of the first liquid discharge unit, based on the movement amount and a clock signal corresponding to an image forming condition.

According to still another embodiment of the present disclosure, there is provided a non-transitory storage medium storing computer-readable program code that, when executed by one or more processors, causes the processors to execute a process in a liquid discharge apparatus. The liquid discharge apparatus includes a plurality of liquid discharge units to discharge liquid to form an image on a recording medium. The plurality of liquid discharge units includes a first liquid discharge unit and a second liquid discharge unit disposed downstream from the first liquid discharge unit in a moving direction of the recording medium. The process includes: capturing a first image of the recording medium at a position corresponding to the first liquid discharge unit; capturing a second image of the recording medium at a position corresponding to the second liquid discharge unit; detecting a movement amount of the recording medium in the moving direction, based on the first image and the second image; and determining a discharge timing of the second liquid discharge unit with respect to discharge of the first liquid discharge unit, based on the movement amount and a clock signal corresponding to an image forming condition.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
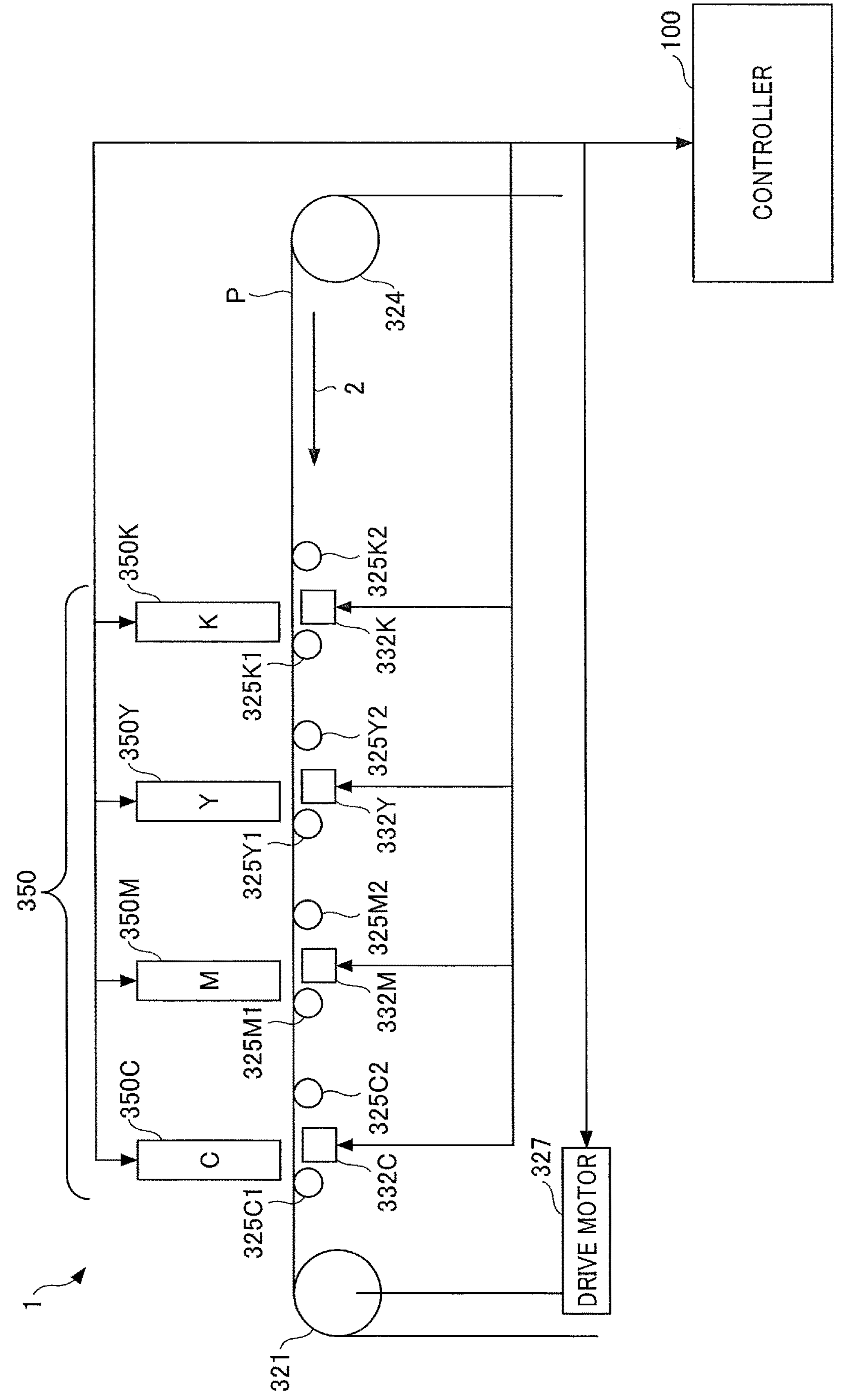
FIG. 1 is a schematic diagram illustrating an internal configuration of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

In an embodiment, a plurality of liquid discharge units including a first liquid discharge unit and a second liquid discharge unit discharge liquid to form an image on a recording medium. The first liquid discharge unit and the second liquid discharge unit are disposed downstream from the first liquid discharge unit in a movement direction of the recording medium.

In addition, a first image of the recording medium is captured at a position corresponding to the first liquid discharge unit, a second image of the recording medium is captured at a position corresponding to the second liquid discharge unit, and the movement amount of the recording medium in the moving direction is detected based on the first image and the second image. The discharge timing of the second liquid discharge unit with respect to the discharge of the first liquid discharge unit is determined based on the detected movement amount and the clock signal.

For example, the clock signal is an electric signal that regularly oscillates, and is a fixed clock signal whose cycle is adjusted according to image forming conditions. The image forming conditions include conditions such as the moving speed of the recording medium or the resolution of image formation. In the embodiment, each of the discharge timing and the image capturing timing is determined based on the fixed clock signal.

Here, when the discharge timing of the liquid is determined based on the output signal of the rotary encoder provided at the conveyance roller of the recording medium, there is a case where the liquid is not discharged at an accurate timing due to an error factor such as an assembling error of the rotary encoder with respect to the conveyance roller or a detection error of the rotary encoder.

On the other hand, in the embodiment, the discharge timing of the second liquid discharge unit with respect to the discharge of the first liquid discharge unit is determined based on the fixed clock signal, so that the liquid can be discharged at an accurate timing without being affected by the above-described error factors.

Below, embodiments of the present disclosure are described with reference to the accompanying drawings. In the drawings, the same components are denoted by the same reference numerals, and redundant description is omitted as appropriate.

Further, the embodiments described below are some examples of a liquid discharge apparatus for embodying the technical idea of the invention, and the invention is not limited to the embodiments described below. The shapes of components, relative arrangements thereof, values of parameters, and the like described below are not intended to limit the scope of the present invention thereto but are intended to exemplify the present invention unless otherwise specified. The size, positional relationship, and the like of members illustrated in the drawings may be magnified for clarity of description.

In the description of the following embodiment, an inkjet type image forming apparatus that forms an image by discharging ink onto a continuous sheet, which is a long sheet of paper, is taken as an example. Here, the continuous sheet is an example of a recording medium, and the ink is an example of liquid.

Note that image formation, recording, printing, printing, and printing in the terms of the embodiments are synonymous. Examples of "recording medium" include recording media such as sheet of paper, recording paper, recording sheet of paper, plain paper, glossy paper, film, and cloth. The material of the recording medium may be paper, thread, fiber, fabric, leather, metal, plastic, glass, wood, ceramics, or the like, as long as the liquid can adhere even temporarily. The recording medium is not limited to a sheet shape, and may be a structure such as a wall or a ceiling, or a side surface, a bottom surface, an upper surface, or the like of a cardboard. The surface of a three dimensional object fixed to the ground, facilities, or the like may be used as the recording medium.

Further, the term "liquid" includes any liquid having a viscosity or a surface tension that can be discharged from a liquid discharge unit. The "liquid" is not limited to a particular liquid and may be any liquid having a viscosity or a surface tension to be discharged from a liquid discharge unit. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. The above-described examples can be used, for example, for inkjet inks, surface treatment liquids, liquids for forming constituent elements of electronic elements and light-emitting elements, and resist patterns of electronic circuits.

The liquid discharge unit is a functional component that discharges and jets liquid from a nozzle. Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

Below, a description is given of an embodiment of the present disclosure.

Configuration Example of Image Forming Apparatus 1

First, a configuration of an image forming apparatus 1 according to an embodiment will be described with reference to FIG. 1. FIG. 1 is a schematic diagram illustrating the internal configuration of an image forming apparatus 1 according to the present embodiment.

In this configuration, each of head units 350K, 350Y, 350M, and 350C discharges ink to apply the ink to the front side of a continuous sheet P to form an image. The head units 350K, 350Y, 350M, and 350C are collectively referred to as a head unit group 350.

The head unit 350K discharges black ink, the head unit 350Y discharges yellow ink, the head unit 350M discharges magenta ink, and the head unit 350C discharges cyan ink. A color image is formed on the continuous sheet P with the respective color inks. In the following description, black, yellow, magenta, and cyan may be referred to as K, Y, M, and C, respectively, to simplify the description.

As illustrated in FIG. 1, the head units 350K, 350Y, 350M, and 350C are provided around the continuous sheet P.

In this configuration, the continuous sheet P is stretched across a drive roller 321, a conveyance roller 324, and eight support rollers 325K1, 325K2, 325Y1, 325Y2, 325M1, 325M2, 325C1, and 325C2. The continuous sheet P is driven by the drive roller 321 rotated by a drive motor 327 and moves along a moving direction indicated by arrow 2 (hereinafter, moving direction 2) in FIG. 1. The moving direction 2 is a direction in which the continuous sheet P moves by the rotation of the drive roller 321.

The eight support rollers 325K1, 325K2, 325Y1, 325Y2, 325M1, 325M2, 325C1, and 325C2 facing the head unit group 350 maintain a tensile state of the continuous sheet P when ink is discharged from each head unit.

In this configuration, a sensor device 332K is disposed between the support roller 325K1 and the support roller 325K2 and upstream from the discharge position of the head unit 350K in the moving direction of the continuous sheet P.

The sensor device 332Y is disposed between the support roller 325Y1 and the support roller 325Y2 and upstream from the discharge position of the head unit 350Y in the moving direction of the continuous sheet P.

Similarly, the sensor device 332M is disposed between the support roller 325M1 and the support roller 325M2 and upstream from the discharge position of the head unit 350M in the moving direction of the continuous sheet P.

The sensor device 332C is disposed between the support roller 325C1 and the support roller 325C2 and upstream from the discharge position of the head unit 350C in the moving direction of the continuous sheet P.

Each of the sensor devices 332K, 332Y, 332M and 332C has an image sensor.

The image sensor emits incoherent light such as light emitted by a light emitting diode (LED) to the continuous sheet P, which is an object to be inspected, and captures an image of the surface of the continuous sheet P in a predetermined capturing range. A base pattern made of paper fibers or the like is formed on the surface of the continuous sheet P, and the pattern of the base pattern differs depending on the position of the continuous sheet P. The sensor devices 332K, 332Y, 332M, and 332C capture images of the surface of the continuous sheet P to capture images of the base pattern.

The sensor devices 332K, 332Y, 332M, and 332C output the images captured by the image sensors included in the sensor devices to a controller 100.

Here, the head unit 350K is an example of a first liquid discharge unit, and the sensor device 332K is an example of a first image capturing unit that captures a first image of the continuous sheet P at a position corresponding to the head unit 350K.

A position between the support roller 325K1 and the support roller 325K2 and upstream from the discharge position of the head unit 350K in the moving direction of the continuous sheet P is an example of a position corresponding to the first liquid discharge unit.

The image of the continuous sheet P captured by the sensor device 332K is an example of a first image.

The head unit 350Y is an example of a second liquid discharge unit, and the sensor device 332Y is an example of a second image capturing unit that captures a second image of the continuous sheet P at a position corresponding to the head unit 350Y.

A position between the support roller 325Y1 and the support roller 325Y2 and upstream from the discharge position of the head unit 350Y in the moving direction of the continuous sheet P is an example of a position corresponding to the second liquid discharge unit.

The image of the continuous sheet P captured by the sensor device 332Y is an example of a second image.

However, the first liquid discharge unit is not limited to the head unit 350K, and the second liquid discharge unit is not limited to the head unit 350Y. Among the three head units 350K, 350Y, and 350M, any one head unit provided upstream in the moving direction 2 may be used as the first liquid discharge unit. Further, among the three head units 350Y, 350M, and 350C, any one head unit provided downstream in the moving direction 2 may be used as the second liquid discharge unit. In this case, a sensor device that captures an image of the continuous sheet P at a position corresponding to the first liquid discharge unit corresponds to the first image capturing unit, and a sensor device that captures an image of the continuous sheet P at a position corresponding to the second liquid discharge unit corresponds to the second image capturing unit.

The controller 100 is a control board that detects a movement amount of the continuous sheet P in the moving direction 2 based on image data obtained from the sensor devices 332K, 332Y, 332M, and 332C. The controller 100 controls the discharge timings of the head units 350Y, 350M, and 350C according to the movement amount of the continuous sheet P in the moving direction 2.

For example, the controller 100 determines the image capturing timing of the second image with respect to the image capturing of the first image based on the fixed clock signal that has a cycle corresponding to the image forming conditions, and controls the sensor device 332Y so that the second image is captured at this image capturing timing.

The controller 100 detects the movement amount of the continuous sheet P in the moving direction 2 based on the first image and the second image captured at the above-described image capturing timings. The controller 100 determines the discharge timing of the head unit 350Y with respect to the discharge of the head unit 350K based on the detected movement amount and the fixed clock signals, and controls the head unit 350Y to discharge ink at the discharge timing.

The controller 100 outputs a drive signal to the drive motor 327 and controls the rotation of the drive motor 327, the movement of the continuous sheet P according to the rotation of the drive motor, and the like.

Example of Hardware Configuration of Controller 100

Figure 2:
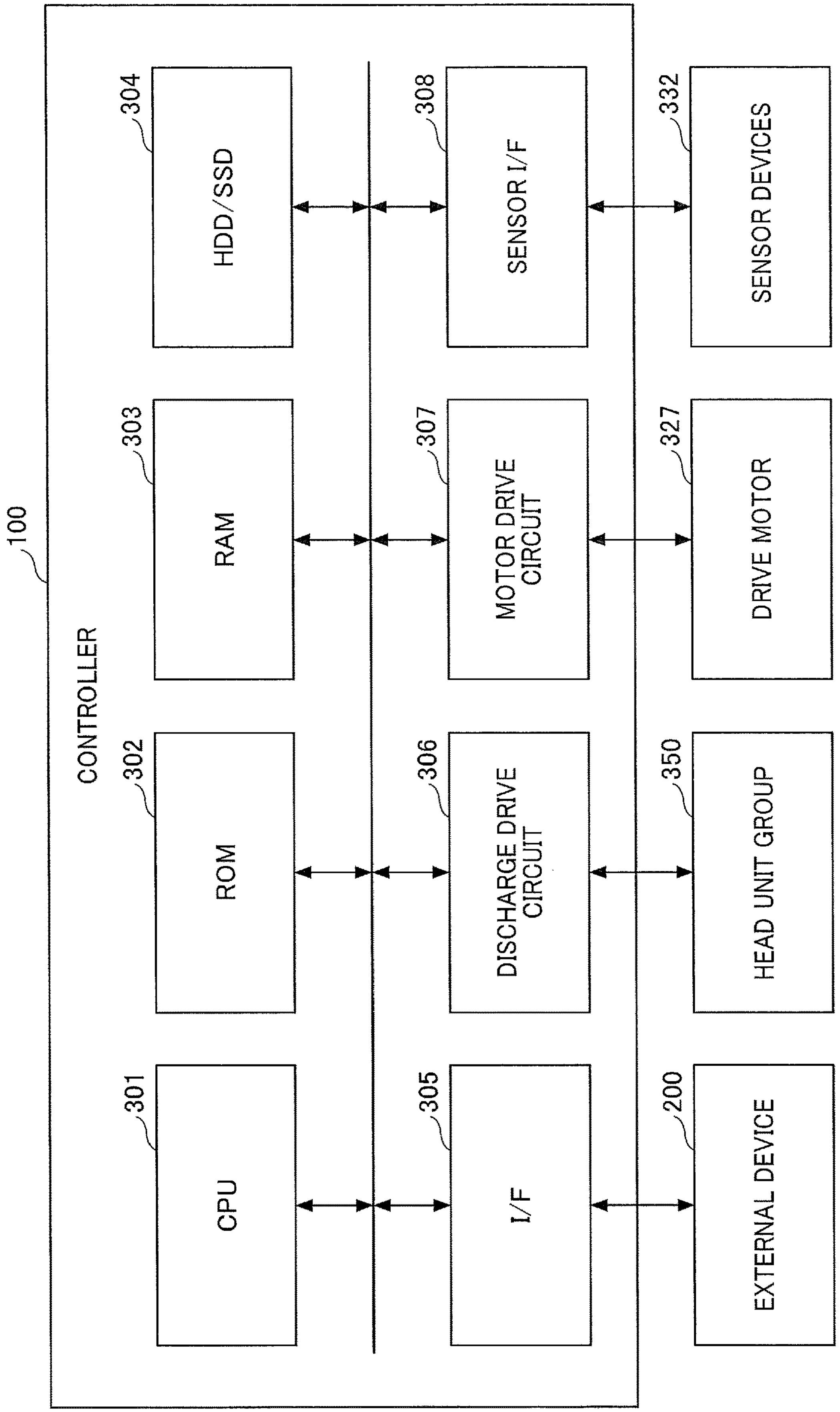
FIG. 2 is a block diagram illustrating a hardware configuration of a controller according to an embodiment.

Next, the hardware configuration of the controller 100 included in the image forming apparatus 1 will be described with reference to FIG. 2. FIG. 2 is a block diagram illustrating an example of the hardware configuration of the controller 100.

As illustrated in FIG. 2, the controller 100 includes a central processing unit (CPU) 301, a read only memory (ROM) 302, a random access memory (RAM) 303, and a hard disk drive (HDD)/solid state drive (SSD) 304. The controller 100 further includes an interface (I/F) 305, a discharge drive circuit 306, a motor drive circuit 307, and a sensor I/F 308.

The CPU 301 uses the RAM 303 as a working area and executes a program stored in the ROM 302.

The HDD/SSD 304 is used as a storage device and stores a preset setting value. The data stored in the HDD/SSD 304 may be read and used by the CPU 301 when the CPU 301 executes a program.

The I/F 305 is an interface that enables communication with an external device 200. The external device 200 is, for example, a client personal computer (PC). However, examples of the external device may include an external server, another image forming apparatus, or the like. Communication with an external device may be enabled via a network such as the Internet or a local access network (LAN).

The discharge drive circuit 306 is an electric circuit that causes the head units 350K, 350Y, 350M, and 350C included in the head unit group 350 to discharge ink, based on control signals input from the CPU 301.

The motor drive circuit 307 is an electric circuit that drives the drive motor 327 based on control signals input from the CPU 301.

The sensor I/F 308 is an interface that enables communication with the sensor devices 332K, 332Y, 332M and 332C. The sensor device(s) 332 may be used as a generic name of the sensor devices 332K, 332Y, 332M, and 332C.

For example, the sensor I/F 308 causes the sensor devices 332 to capture images based on control signals input from the CPU 301. The control items of the sensor devices 332 include an image capturing timing, a shutter speed, an irradiation timing of a laser beam, an irradiation light amount of a laser beam, and the like. The sensor I/F 308 can input image data captured by the sensor devices 332 from the sensor devices 332.

Example of Functional Configuration of Controller 100

Figure 3:
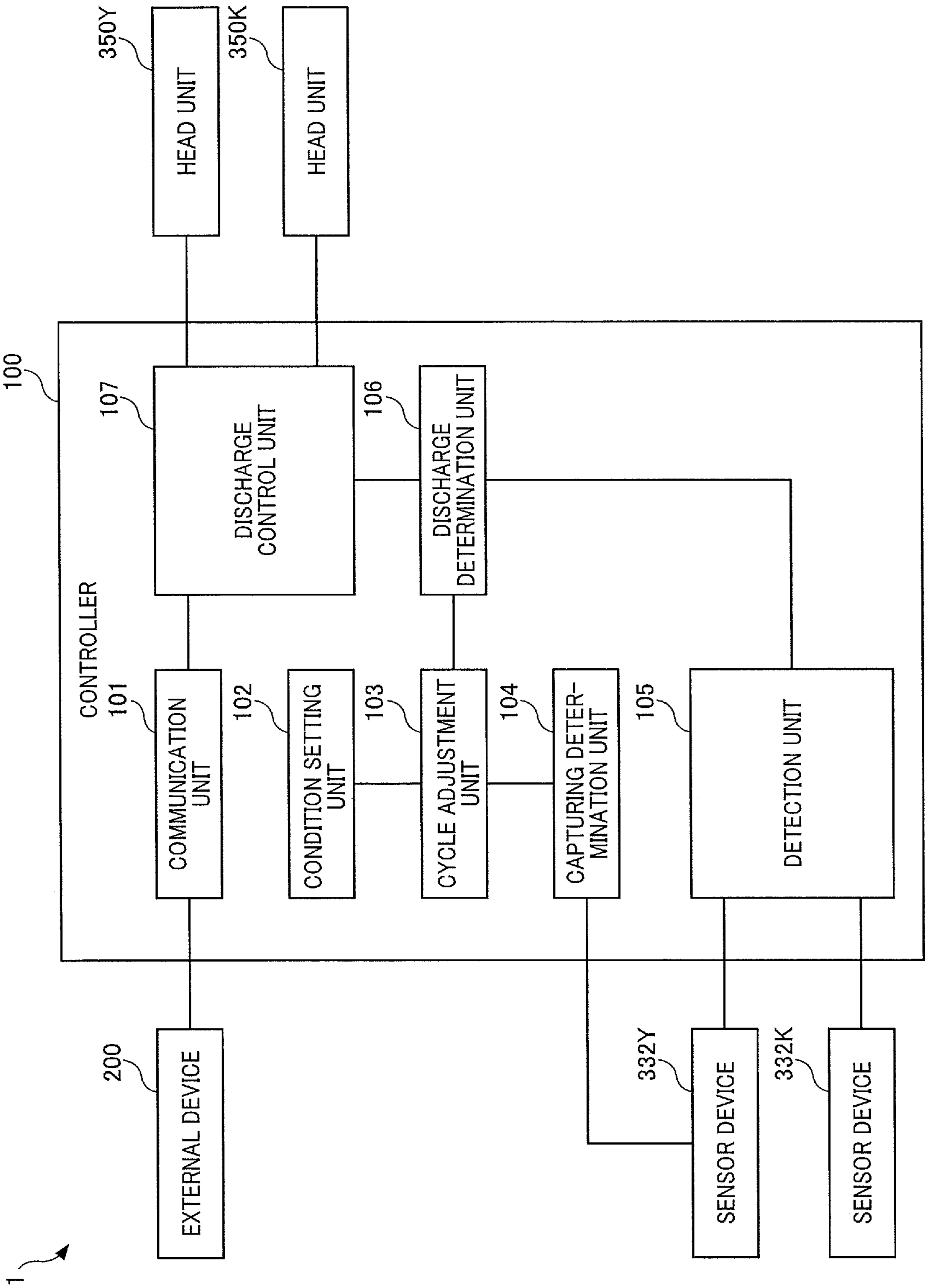
FIG. 3 is a block diagram illustrating a functional configuration of a controller according to the first embodiment.

Next, the functional configuration of the controller 100 will be described with reference to FIG. 3. FIG. 3 is a block diagram illustrating an example of the functional configuration of the controller 100.

As illustrated in FIG. 3, the controller 100 includes a communication unit 101, a condition setting unit 102, a cycle adjustment unit 103, a capturing determination unit 104, a detection unit 105, a discharge determination unit 106, and a discharge control unit 107.

Each of the above-described units is a function or means for functioning that is implemented by any of the components illustrated in FIG. 2 operating in response to an instruction from the CPU 301 in accordance with a program developed from the ROM 302 on the RAM 303. Although FIG. 3 illustrates a main configuration of the controller 100, the controller 100 may have other configurations.

Here, for example, for the continuous sheet P moving at a predetermined moving speed V, the head unit 350K discharges ink of K color, and the head unit 350Y discharges ink of Y color. When the head unit 350Y discharges ink at a timing at which the continuous sheet P moves by a predetermined movement amount after the head unit 350K discharges ink, the K color ink and the Y color ink are applied to the continuous sheet P in a predetermined positional relationship.

However, an error may occur in an actual movement amount of the continuous sheet P with respect to the predetermined movement amount due to, for example, a slip between the drive roller 321 and the continuous sheet P, expansion and contraction of the continuous sheet P, or a rotation speed fluctuation of the drive roller 321.

If the discharge timing of the head unit 350Y with respect to the discharge of the head unit 350K deviates due to a movement amount error, the K color ink and the Y color ink are applied to the continuous sheet P with a deviation from a desired positional relationship, thus causing a reduction in the quality of an image due to the color deviation.

On the other hand, in the controller 100, first, the cycle adjusting unit 103 adjusts the cycle of the fixed clock signal according to the image forming conditions set by the condition setting unit 102. The capturing determination unit 104 determines the image capturing timing of the second image with respect to the image capturing of the first image, based on the fixed clock signal.

The detection unit 105 detects the movement amount of the continuous sheet P in the moving direction 2, based on the first image and the second image captured at the image capturing timing determined by the capturing determination unit 104. The discharge determination unit 106 determines the discharge timing of the head unit 350Y with respect to the discharge of the head unit 350K, based on the movement amount detected by the detection unit 105 and the fixed clock signals.

The discharge control unit 107 causes the head unit 350K to discharge ink and also causes the head unit 350Y to discharge ink at the discharge timing determined by the discharge determination unit 106. Accordingly, the deviation of the discharge timing of the head unit 350Y with respect to the discharge of the head unit 350K caused by an error in the movement amount of the continuous sheet P is corrected, and the color deviation of the image formed on the continuous sheet P is prevented.

Hereinafter, the function of each unit will be described in more detail with reference to FIG. 3.

The communication unit 101 transmits and receives various types of information between the external device 200 and the controller 100. In the present embodiment, the controller 100 receives image data, which is a source of an image to be formed on the continuous sheet P, from the external device 200 via the communication unit 101.

The condition setting unit 102 sets image forming conditions. The image forming conditions include, for example, the moving speed of the continuous sheet P and the resolution at which the image forming apparatus 1 forms an image on the continuous sheet P. The condition setting unit 102 can set image forming conditions according to, for example, an input operation of the image forming conditions by a user of the image forming apparatus 1. The condition setting unit 102 causes the HDD/SSD 304 of FIG. 2 to hold the set image forming conditions.

The cycle adjustment unit 103 acquires information on image forming conditions with reference to the HDD/SSD 304, and outputs a fixed clock signal whose cycle is adjusted according to the image forming conditions. For example, the cycle adjustment unit 103 adjusts and changes the cycle of a CPU clock signal that is output by the CPU 301 illustrated in FIG. 2 to a cycle corresponding to the image forming conditions using a frequency divider.

The cycle adjustment unit 103 outputs a fixed clock signal having the cycle corresponding to the image forming conditions to each of the capturing determination unit 104 and the discharge determination unit 106. In the present embodiment, a clock signal obtained by adjusting the clock cycle of the CPU clock signal to a predetermined cycle is referred to as a fixed clock signal.

The capturing determination unit 104 determines the image capturing timing of the second image with respect to the image capturing of the first image, based on the fixed clock signal.

This will be described in more detail. Assuming that the distance between the sensor device 332K and the sensor device 332Y in the moving direction 2 is D meter (m) and the moving speed of the continuous sheet P is V m/second (s), the continuous sheet P passes through the sensor device 332K after a lapse of time T (=D/V [s]) after passing through the position of the sensor devices 332Y.

However, if there is an error in the movement amount, the time T is shifted. For this reason, after the continuous sheet P passes through the position of the sensor device 332K, the controller 100 causes the sensor device 332Y to capture the second image after a time Ts, which is a timing slightly earlier than the time T, has elapsed. The controller 100 detects a movement amount error based on the captured second image and the first image captured simultaneously with the discharge of the head unit 350K, and causes the head unit 350Y to discharge ink at a timing obtained by correcting the time T based on the movement amount error.

The capturing determination unit 104 measures the above-described time Ts with reference to the fixed clock signals, and determines the image capturing timing such that the second image is captured after the time Ts has elapsed since the first image is captured simultaneously with the discharge of the head unit 350K.

When the time difference between the time T and the time Ts is increased with respect to the time taken to calculate the movement amount error after the second image is captured, the head unit 350Y can discharge at the discharge timing after the influence of the movement amount error is corrected.

The capturing determination unit 104 divides the predetermined time Ts by the cycle M of the fixed clock signal to determine in advance the image capturing target number of pulses Pi indicating the image capturing timing of the second image.

When the image forming apparatus 1 forms an image, the capturing determination unit 104 counts the number of clock pulses of the fixed clock signals starting from the time at which the sensor device 332K capture the first image. The sensor device 332Y is caused to capture an image at the timing when the counted number of clock pulses reaches the image capturing target number of pulses Pi. Accordingly, the second image can be captured at the timing when the time Ts has elapsed after the continuous sheet P has passed through the position of the sensor device 332K.

The detection unit 105 detects the movement amount error based on the first image captured by the sensor device 332K and the second image captured by the sensor device 332Y at the image capturing timing determined by the capturing determination unit 104.

The first image is an image of the continuous sheet P captured at a position corresponding to the head unit 350K. The second image is an image of the continuous sheet P captured at a position corresponding to the head unit 350Y.

Accordingly, when the sensor device 332Y captures the second image after the predetermined time T has passed since the sensor device 332K captures the first image, the first image and the second image are the same image.

However, if there is a movement amount error of the continuous sheet P, the image of the continuous sheet P in the second image becomes an image shifted along the moving direction 2 with respect to the image of the continuous sheet P in the first image according to the movement amount error.

The detection unit 105 performs a cross-correlation operation between the input first image and second image, and calculates a deviation amount in the moving direction 2 of the second image with respect to the first image. Then, the detection unit 105 detects a movement amount error of the continuous sheet P in the moving direction 2 from the calculated deviation amount.

When the movement amount error is added to the predetermined distance D, the movement amount of the continuous sheet P between the sensor device 332K and the sensor device 332Y is obtained. Therefore, it can be said that the detection unit 105 detects the movement amount of the continuous sheet P.

In the present embodiment, since the second image is captured in the time Ts shorter than the time T, the movement amount error ΔDs of the continuous sheet P at the timing when the time Ts has elapsed after the continuous sheet P passes through the position of the sensor device 332K is obtained. The detection unit 105 outputs the movement amount error ΔDs to the discharge determination unit 106.

The discharge determination unit 106 determines the discharge timing of the head unit 350Y with respect to the discharge of the head unit 350K based on the movement amount error ΔDs input from the detection unit 105 and the fixed clock signal input from the cycle adjustment unit 103.

In the present embodiment, since the movement amount error ΔDs at the time point of the time Ts is detected, the time $\{T-(Ts+\Delta Ds/V)\}$ is the corrected discharge timing of the head unit 350Y. The discharge determination unit 106 divides the time $\{T-(Ts+\Delta Ds/V)\}$ by the cycle M of the fixed clock signal to obtain a discharge target number of pulses Pj.

The discharge determination unit 106 counts the number of clock pulses of the fixed clock signal starting from the time at which the sensor device 332Y captures the second image, and causes the head unit 350Y to discharge ink via the discharge control unit 107 at the timing when the number of clock pulses reaches the discharge target number of pulses Pj.

The discharge control unit 107 causes the head unit 350K to discharge ink, based on image data input via the communication unit 101, and also causes the head unit 350Y to discharge ink at a timing determined by the discharge determination unit 106.

Such a configuration allows the head unit 350Y to discharge ink at a timing at which the influence of the movement amount error of the continuous sheet P is corrected with respect to the discharge of the head unit 350K.

Operation Example of Image Forming Apparatus 1

Next, the operation of the image forming apparatus 1 will be described with reference to FIGS. 4 and 5.

Operation Timing

Figure 4:
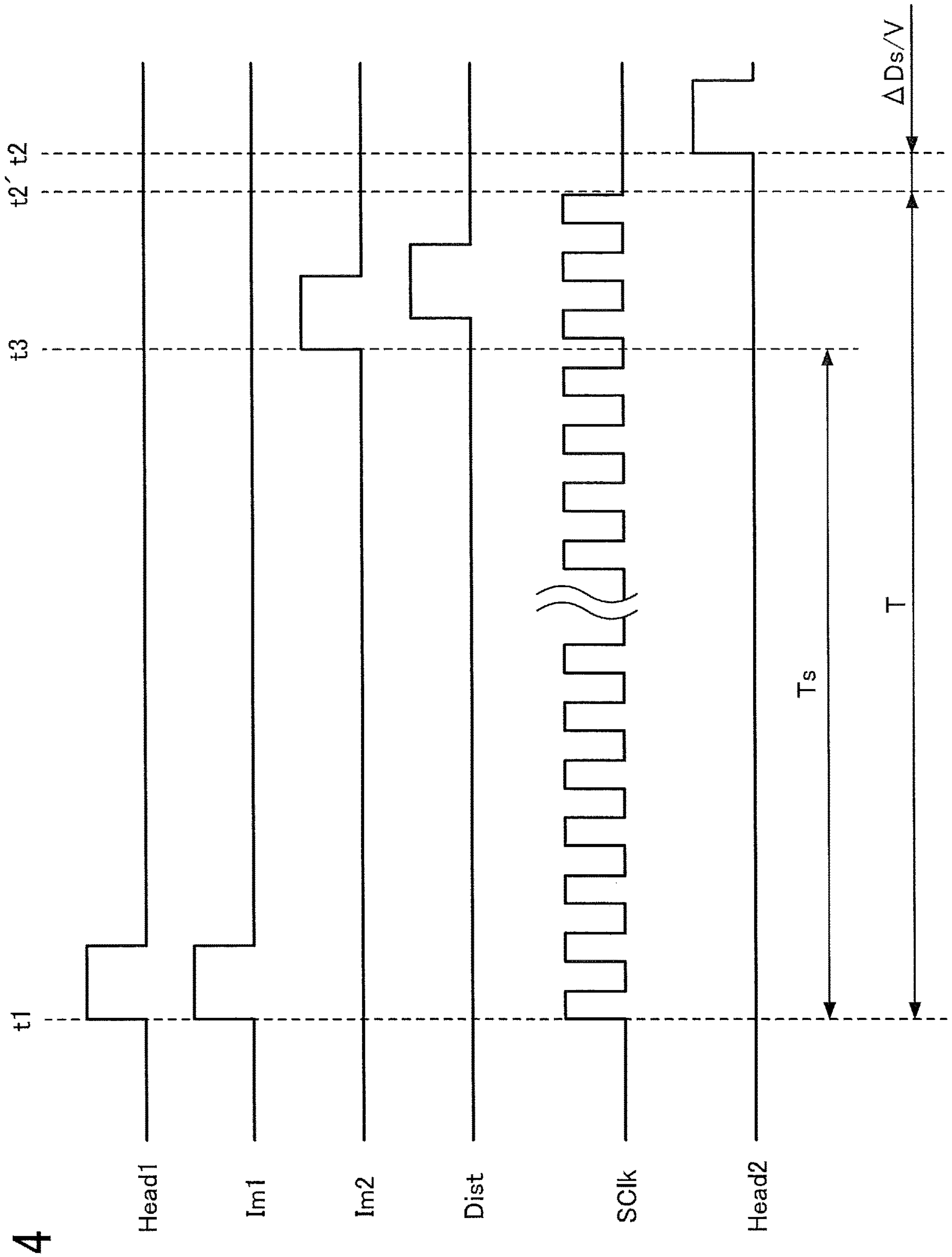
FIG. 4 is a timing chart illustrating an example of image capturing and discharge timing.

FIG. 4 is a timing chart illustrating an example of image capturing and discharge timings.

The Head1 signal illustrated in the uppermost row in FIG. 4 indicates the discharge timing of the head unit 350K, and the Im1 signal below the Head1 signal indicates the image capturing timing of the sensor device 332K.

The Im2 signal below the Im1 signal indicates the image capturing timing of the sensor device 332Y, and the Dist signal below the Im2 signal indicates the calculation timing of the movement amount error ΔDs by the detection unit 105. The SCLk signal below the Dist signal indicates the fixed clock signal, and the Head2 signal below the SCLk signal indicates the discharge timing of the head units 350K.

The time t1 is a time (timing) at which the head unit 350K discharges ink and a time at which the sensor device 332K captures an image. Both are substantially the same. The time t3 is a time at which the time Ts has elapsed from the time t1.

The time t2' is a time at which the head unit 350Y should discharge ink when there is no movement amount error, and is a time at which a time T (=D/V [s]) has elapsed from the time t1.

The time t2 is a discharge timing of the head unit 350Y having been corrected based on the movement amount error ΔDs detected by the detection unit 105 and the fixed clock signals.

As illustrated in FIG. 4, the head unit 350K discharges ink at time t1, and the sensor device 332K captures the first image at substantially the same timing.

Thereafter, the capturing determination unit 104 counts the number of clock pulses from the time t1, and causes the sensor device 332Y to capture the second image at the time t3 when the number of clock pulses reaches the image capturing target number of pulses Pi (=Ts/m).

The detection unit 105 calculates the movement amount error ΔDs based on the first image and the second image (see the Dist signal). The discharge determination unit 106 counts the number of clock pulses from the time t3, and causes the head unit 350Y to discharge ink at the time t2 when the number of clock pulses reaches the discharge target number of pulses Pj [={T−(Ts+ΔDs/V)}/m].

Operation Flow

Figure 5:
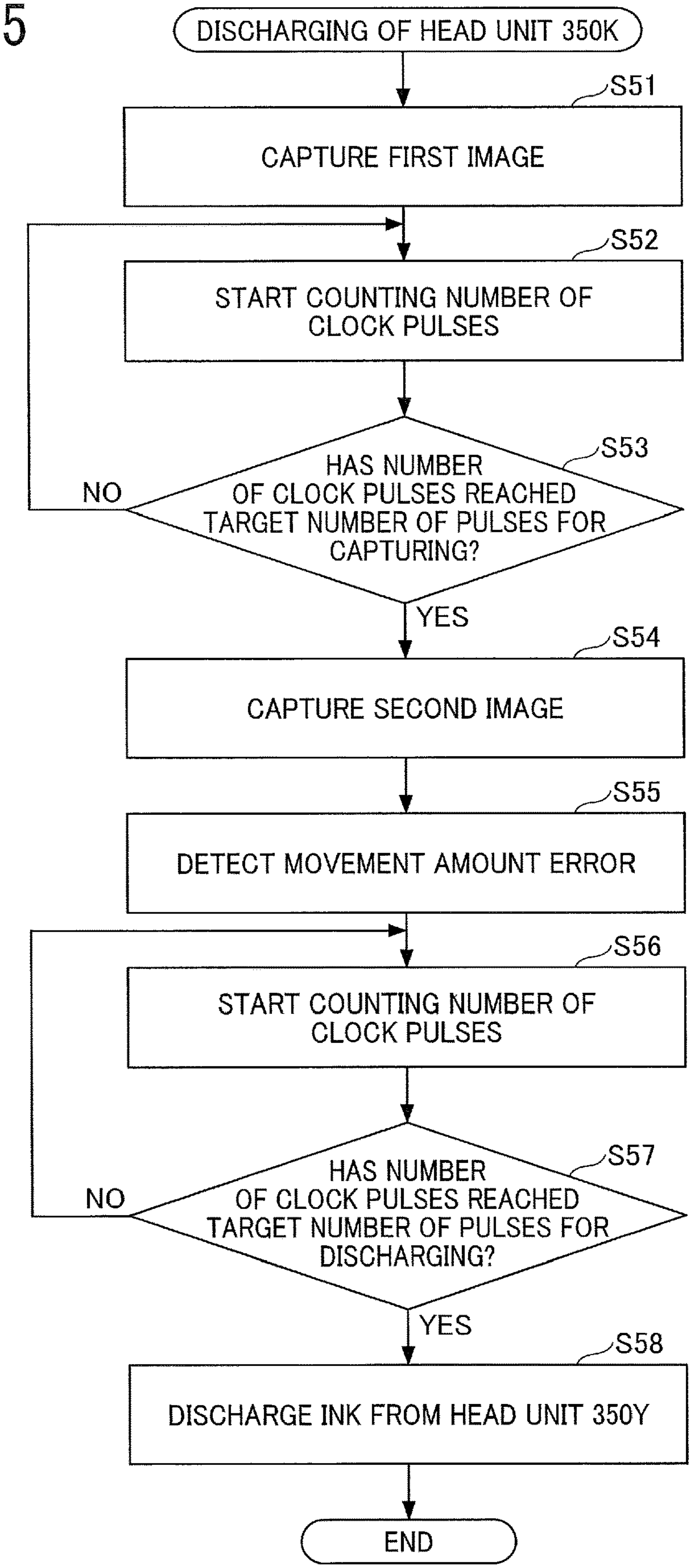
FIG. 5 is a flowchart illustrating an operation of an image forming apparatus according to an embodiment.

FIG. 5 is a flowchart illustrating an example of the operation of the image forming apparatus 1. FIG. 5 illustrates an operation triggered by a timing at which the head unit 350K discharges K color ink under the control of the discharge control unit 107.

First, in step S51, the sensor device 332K captures a first image under the control of the detection unit 105. The discharge of the head unit 350K and the step S51 are performed substantially simultaneously.

Subsequently, in step S52, the capturing determination unit 104 counts the number of clock pulses of the fixed clock signal starting from the time t1 at which the sensor device 332K has captured the first image.

Subsequently, in step S53, the capturing determination unit 104 determines whether the number of clock pulses has reached the image capturing target number of pulses Pi.

When it is determined in step S54 that the number of clock pulses has not reached the image capturing target number of pulses Pi (No in step S53), the operation of step S52 and its subsequent step is performed again.

On the other hand, when it is determined in step S53 that the number of clock pulses has reached the image capturing target number of pulses Pi (YES in step S53), in step S54, the sensor device 332Y captures a second image in response to an instruction from the capturing determination unit 104.

Subsequently, in step S55, the detection unit 105 calculates a movement amount error ΔDs based on the first image and the second image, and outputs the movement amount error ΔDs to the discharge determination unit 106.

Subsequently, in step S56, the discharge determination unit 106 counts the number of clock pulses of the fixed clock signal.

Subsequently, in step S57, the discharge determination unit 106 determines whether the number of clock pulses has reached the discharge target number of pulses Pj.

When it is determined in step S57 that the number of clock pulses has not reached the discharge target number of pulses Pj (NO in step S57), the operation of step S56 and its subsequent step is performed again.

On the other hand, when it is determined in step S57 that the number of clock pulses has reached the discharge target number of pulses Pj (YES in step S57), in step S58, the head unit 350Y discharges Y color ink under the control of the discharge control unit 107 in response to the instruction of the discharge determination unit 106.

In this manner, the image forming apparatus 1 can correct the deviation of the head unit 350Y with respect to the discharge of the head unit 350K and cause the head unit 350Y to discharge ink at the corrected timing.

Effects of Image Forming Apparatus 1

Next, functions and effects of the image forming apparatus 1 will be described.

In the related art, there is known an image forming apparatus in which a plurality of liquid discharge units discharge ink to form an image on a recording medium such as a continuous sheet. In such an image forming apparatus, there is a case where a rotary encoder is attached to a conveyance roller provided upstream from a plurality of liquid discharge units in a moving direction of a continuous sheet to be moved, and each of the plurality of liquid discharge units discharges ink based on an output signal of the rotary encoder.

However, an error may occur in an actual movement amount of the continuous sheet due to, for example, a slip between the continuous sheet and a drive roller for moving the continuous sheet, expansion and contraction of the continuous sheet, and a rotation speed fluctuation of the drive roller.

Figure 6:
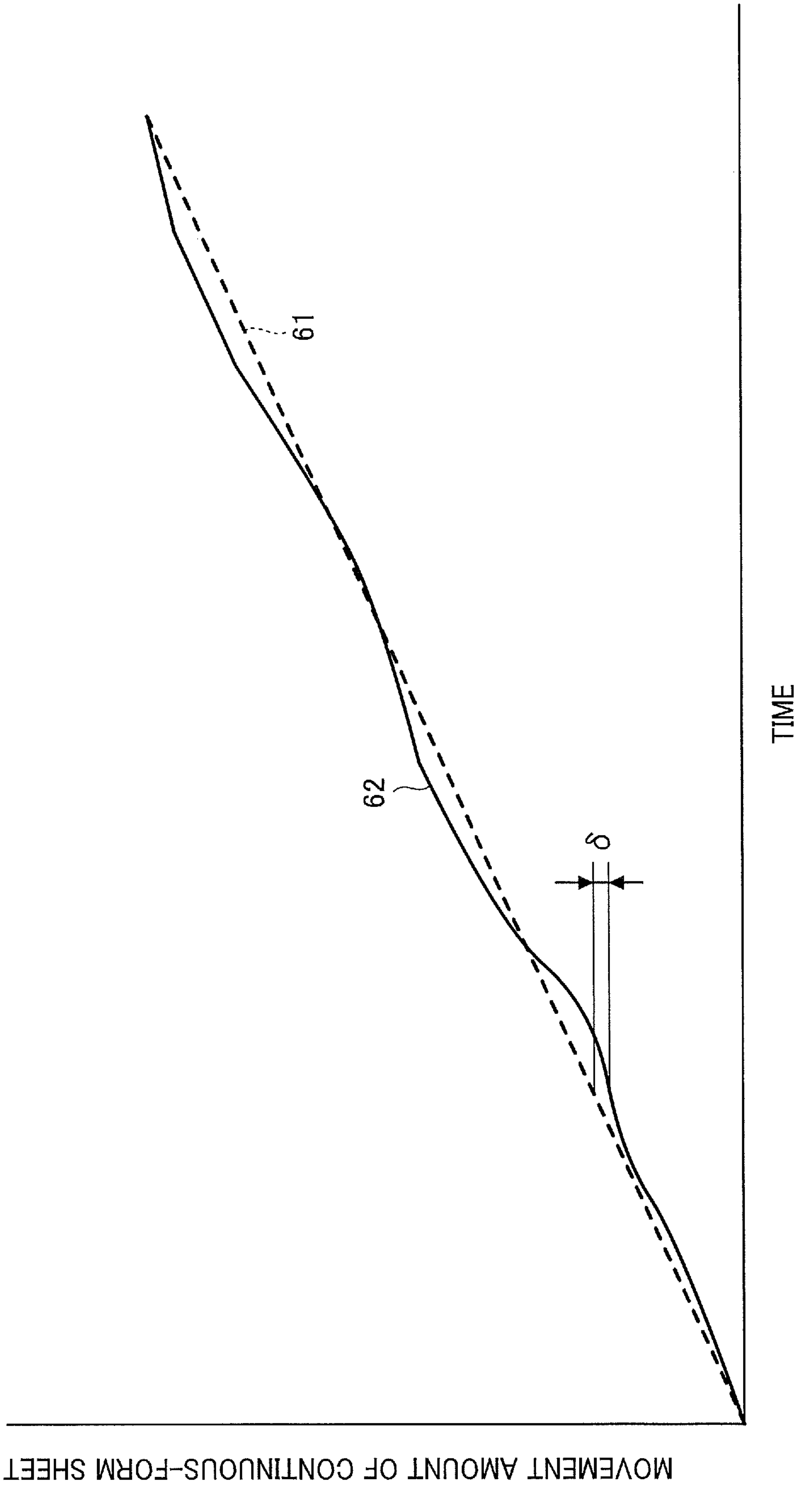
FIG. 6 is a diagram illustrating an example of the relation between output signal of a rotary encoder and movement amount of a continuous sheet.

Here, FIG. 6 is a diagram illustrating an example of a relationship between the output signal of a rotary encoder and the movement amount of a continuous sheet. In FIG. 6, the horizontal axis represents time, and the vertical axis represents the movement amount of a continuous sheet. A detected value 61 (broken line) indicates the detection value of the movement amount of the continuous sheet detected based on the output signal of the rotary encoder. An actual value 62 (solid line) indicates an actual movement amount of the continuous sheet.

As illustrated in FIG. 6, the detected value 61 and the actual value 62 deviate from each other. Of the fluctuations of the actual value 62 with respect to the detected value 61, the cycle of a component that periodically occurs substantially coincides with, for example, the outer circumference of a drive roller that moves the continuous sheet.

The discharge timing of ink by the liquid discharge unit is shifted according to the deviation between the detected value 61 and the actual value 62, and the landing positions of ink for each color on the continuous sheet are shifted, for example, as indicated by a deviation amount δ in FIG. 6. This may degrade the image quality.

In order to correct such a deviation between the detected value and the actual value, in the related art, for example, ink discharge timing is adjusted based on an output signal of a rotary encoder and a movement amount of a continuous sheet detected using sensors disposed at positions corresponding to a plurality of liquid discharge units (see Japanese Unexamined Patent Application Publication No. 2018-158573).

Figure 7:
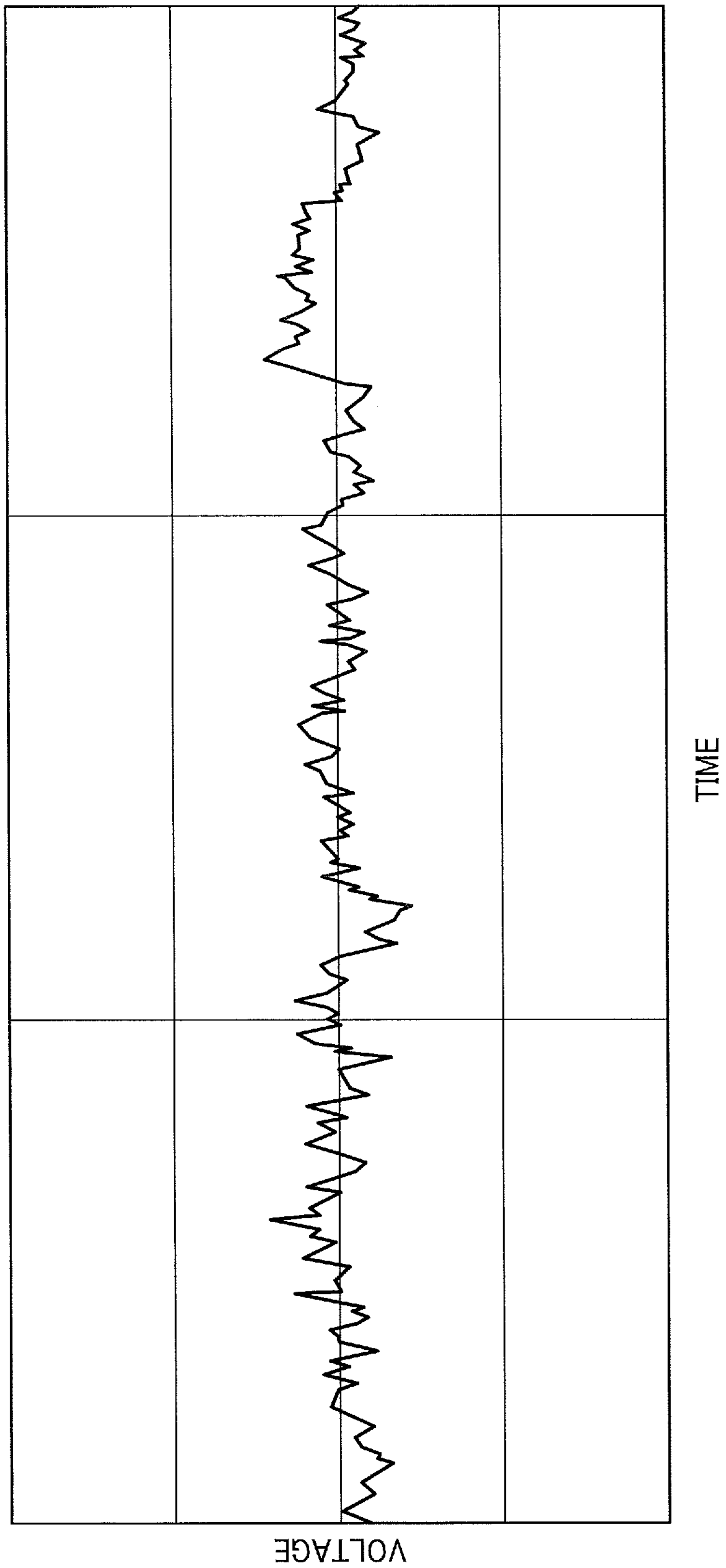
FIG. 7 is a diagram illustrating a variation error of an output signal of a rotary encoder.

However, in the configuration described in Japanese Unexamined Patent Application Publication No. 2018-158573, for example, an attachment error of the rotary encoder with respect to a conveyance roller or a detection error of the rotary encoder may occur. FIG. 7 is a diagram illustrating an example of a variation error of an output signal of a rotary encoder. In FIG. 7, the horizontal axis represents time, and the vertical axis represents a voltage signal that is an output signal of the rotary encoder.

FIG. 7 illustrates an output signal of the rotary encoder when the conveyance roller is stationary. Therefore, although the output signal should be a constant value correctly, the output signal varies with time, and a variation error occurs. Further, if there is an attachment eccentricity error of the rotary encoder with respect to the conveyance roller, a periodic error is further superimposed on the output signal of the rotary encoder with respect to the variation error in FIG. 7.

Accordingly, when the discharge timing of the liquid discharge unit is determined based on the output signal of the rotary encoder, the deviation of the ink discharge timing may not be accurately corrected. Further, when the detection timing of a sensor is determined based on the output signal of the rotary encoder, the movement amount of the continuous sheet may not be accurately detected and the deviation of the ink discharge timing may not be accurately corrected in some cases. Accordingly, liquid (e.g., ink) may not be discharged at an accurate timing.

In the present embodiment, a plurality of head units including the head unit 350K (first liquid discharge unit) and the head unit 350Y provided downstream from the head unit 350K in the moving direction of the continuous sheet P (recording medium) discharge ink (an example of liquid) to form an image on the continuous sheet P.

A first image of the continuous sheet P is captured at a position corresponding to the head unit 350K, and a second image of the continuous sheet P is captured at a position corresponding to the head unit 350Y.

A movement amount error of the recording medium in the moving direction is detected based on the first image and the second image, and the discharge timing of the head unit 350Y with respect to the discharge of the head unit 350K is determined based on the movement amount error and a fixed clock signal (clock signal).

The fixed clock signal is, for example, a signal corresponding to an image forming condition. The image forming condition includes, for example, at least one of the moving speed of the continuous sheet P or the resolution of an image formed by the image forming apparatus 1.

Since the fixed clock signal is an electric signal that regularly oscillates, the fixed clock signal does not include an attachment error and a variation error that are included in the output signal of the rotary encoder. Accordingly, determining the discharge timing of the head unit 350Y with respect to the discharge of the head unit 350K with reference to the fixed clock signal allows liquid (e.g., ink) to be discharged at an accurate timing without being affected by error factors such as an attachment error or a variation error of the rotary encoder.

Further, in the present embodiment, the image capturing timing of the second image with respect to the image capturing of the first image is determined based on the fixed clock signal, and the movement amount error is detected based on the first image and the second image captured at the above-described image capturing timing.

The movement amount of the continuous paper P can be more accurately detected by determining the image capturing timing of the second image with respect to the image capturing of the first image with reference to the fixed clock signal. Such a configuration can accurately correct the discharge timing of the head unit 350Y with respect to the discharge of the head unit 350K and to discharge liquid at an accurate timing.

Note that the fixed clock signal is not necessarily used to determine the image capturing timing of the second image with respect to the capturing of the first image. For example, the image capturing timing may be determined based on an output signal of a rotary encoder provided at the conveyance roller 324 (see FIG. 1). However, the movement amount of the continuous sheet P can be detected more accurately when the fixed clock signal is used as a reference than when the output signal of the rotary encoder is used as a reference.

In the present embodiment, a fixed clock signal is used in accordance with an image forming condition such as the moving speed of the continuous sheet P or the resolution of an image formed by the image forming apparatus 1. Such a configuration can use a clock signal obtained by adjusting the cycle of the existing clock signal output from, for example, the CPU 301 illustrated in FIG. 2.

Accordingly, such a configuration can discharge liquid at an accurate timing with a simple configuration and at a relatively low cost without additionally installing, for example, a crystal oscillator that generates an electrical signal that regularly oscillates. Note that, in some embodiments, for example, a crystal oscillator that generates a regularly oscillating electrical signal may be included and the cycle of the output signal of the crystal oscillator may be adjusted and used as the fixed clock signal.

Second Embodiment

Next, an image forming apparatus 1*a* according to a second embodiment of the present disclosure will be described.

Figure 8:
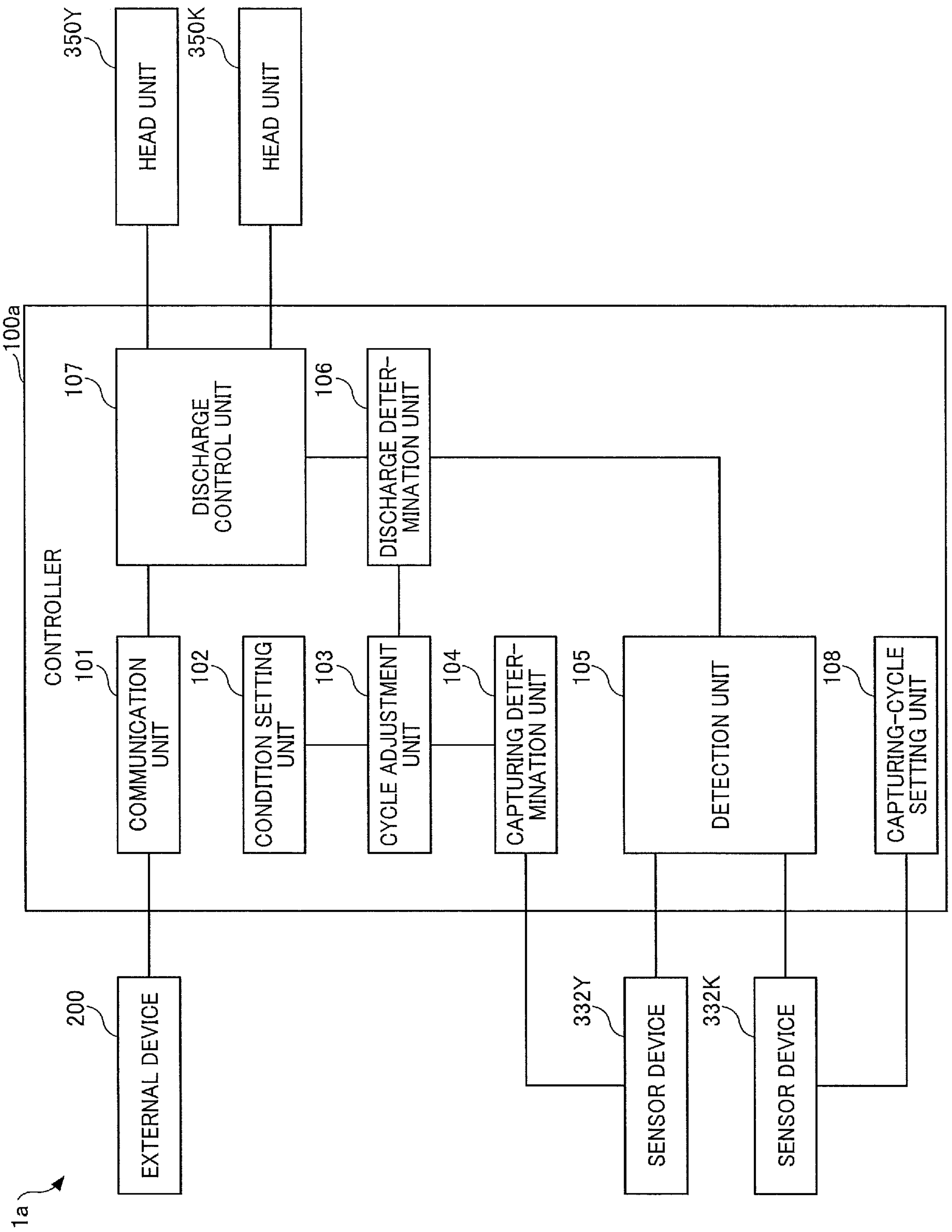
FIG. 8 is a block diagram illustrating a functional configuration of a controller according to a second embodiment.

FIG. 8 is a block diagram illustrating an example of a functional configuration of a controller 100*a* included in the image forming apparatus 1*a*. As illustrated in FIG. 8, the controller 100*a* includes a capturing-cycle setting unit 108.

The capturing-cycle setting unit 108 is a functional unit implemented by any of the components illustrated in FIG. 2 operating in response to an instruction from a ROM 302 in accordance with a program developed on a RAM 303 from a CPU 301.

The capturing-cycle setting unit 108 sets an image capturing cycle U of a sensor device 332K in accordance with the following expression (1). $U \leq (\pi \times \varphi / V)/10$ . . . (1) Here, $\pi$ represents a circular constant, $\varphi$ represents a diameter of a drive roller 321, and the moving speed V represents a moving speed of a continuous sheet P.

The sensor device 332K captures a first image in the image capturing cycle U.

Figure 9:
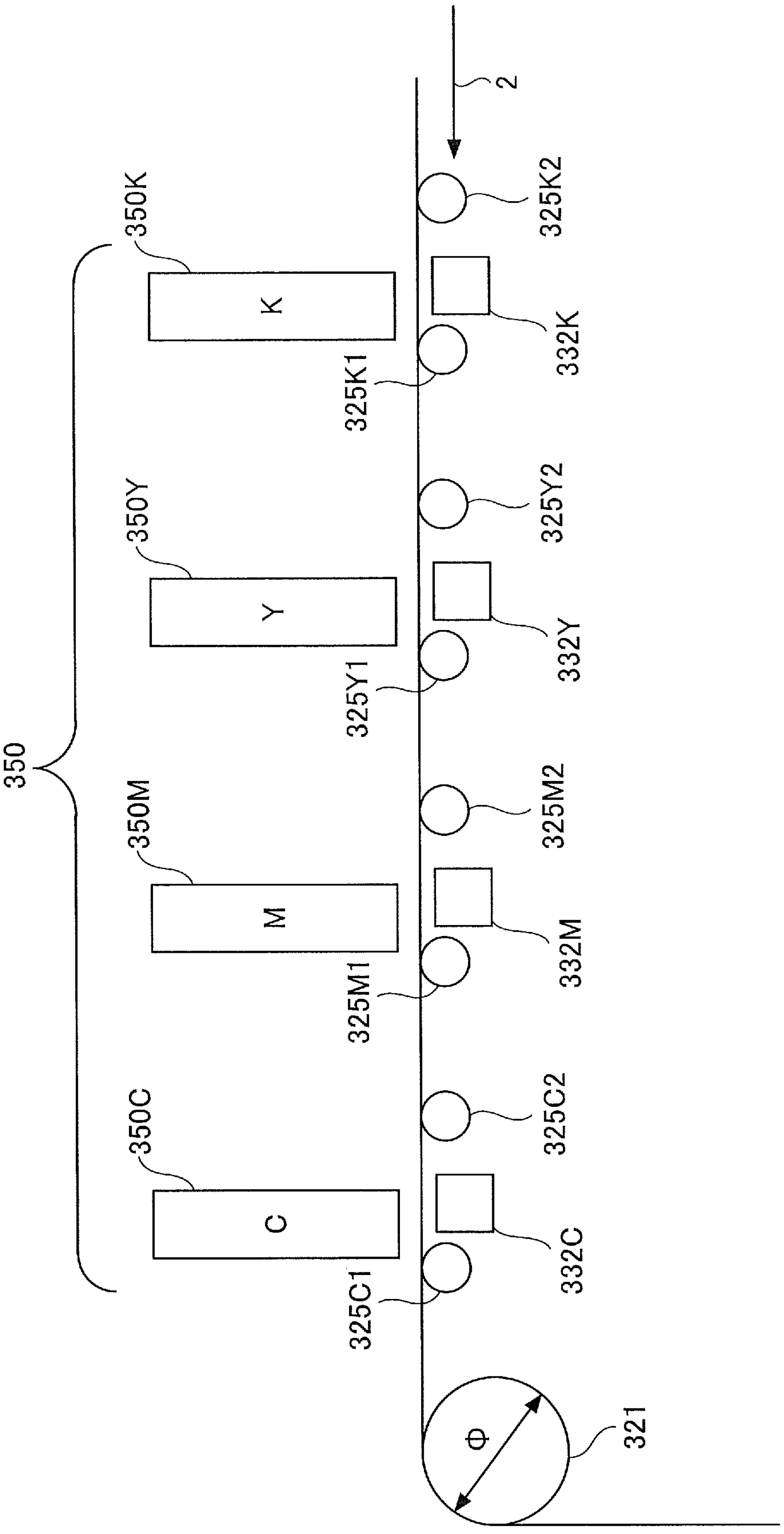
FIG. 9 is a diagram illustrating an example of the diameter of a drive roller.

FIG. 9 is a diagram illustrating an example of the diameter of the drive roller 321. As illustrated in FIG. 9, the drive roller 321 is a roller that is disposed downstream from a plurality of head units 350K, 350Y, 350M, and 350C in a moving direction 2 and moves the continuous sheet P by rotation. The diameter $\varphi$ corresponds to the diameter of the drive roller 321.

As illustrated in FIG. 6 described above, the cycle of a periodically occurring component in fluctuations of the actual value 62 with respect to the detected value 61 substantially matches, for example, the outer circumference (=π×φ) of the drive roller 321 that moves the continuous sheet P.

Therefore, setting the image capturing cycle U to be equal to or less than one-tenth of the time (π·φ/V) during which the drive roller 321 makes one rotation, the movement amount error of the continuous sheet P caused by the cycle error of the drive roller 321 can be detected with a resolution equal to or less than one-tenth of the movement amount error.

Accordingly, the influence of the movement amount error of the continuous sheet P caused by the cycle error of the drive roller 321 can be accurately corrected, thus allowing liquid to be discharged with the head unit 350Y at an accurate timing. Note that other effects are equivalent to those described in the first embodiment.

Although some embodiments have been described above, embodiments of the present invention are not limited to the above-described embodiments specifically disclosed, and various modifications and changes can be made without departing from the scope of the claims.

In the above-described embodiments, the examples have been described in which the first liquid discharge unit is the head unit 350K and the second liquid discharge unit is the head unit 350Y, and the head unit 350Y is caused to discharge liquid at an accurate timing with respect to the discharge of the head unit 350K. However, embodiments of the invention are not limited to the above-described examples.

Among the four head units 350K, 350Y, 350M, and 350C, any one head unit disposed more upstream in the moving direction 2 may be set as a first liquid discharge unit, and any one head unit disposed downstream from the first liquid discharge unit in the moving direction 2 may be set as a second liquid discharge unit. Such a configuration allows the second liquid discharge unit to discharge liquid at an accurate timing with respect to the discharge of the first liquid discharge unit.

In addition, in the above-described embodiments, the configurations in which the sensor device 332K and the sensor device 332Y irradiate the continuous sheet P with incoherent light such as light emitted by an LED and capture an image of the continuous sheet P have been described as examples. However, embodiments of the invention are not limited to the above-described examples.

For example, the sensor device 332K and the sensor device 332Y may capture a speckle pattern generated when the continuous sheet P is irradiated with laser light. Alternatively, a predetermined mark may be formed on the continuous sheet P in advance, and captured images of the mark may be used as the first image and the second image. With these configurations, the effects equivalent to those of the above-described embodiments can be obtained.

In addition, when the cross-correlation calculation between the first image and the second image is performed, not only the deviation of the first image and the second image in the moving direction 2 but also the deviation between the first image and the second image in the direction orthogonal to the moving direction 2 can be detected.

By using this, when a recording medium such as the continuous sheet P is shifted in the direction orthogonal to the moving direction 2, the shift amount can be detected by the cross-correlation calculation. Moving the head units 350K, 350Y, 350M, and 350C in accordance with the detected shift amount, the influence of the shift of the recording medium in the direction orthogonal to the moving direction 2 can be corrected, thus allowing an image to be formed at a correct position on the recording medium.

For the movement of the head units 350K, 350Y, 350M, and 350C in the direction orthogonal to the moving direction 2, for example, actuators disposed in the head units 350K, 350Y, 350M, and 350C can be used.

Embodiments also include a liquid discharge method. According to an embodiment of the present disclosure, there is provided a liquid discharge method to be executed by a liquid discharge apparatus including a plurality of liquid discharge units to discharge liquid to form an image on a recording medium, the plurality of liquid discharge units including a first liquid discharge unit and a second liquid discharge unit disposed downstream from the first liquid discharge unit in a moving direction of the recording medium. The liquid discharge method includes: capturing a first image of the recording medium at a position corresponding to the first liquid discharge unit; capturing a second image of the recording medium at a position corresponding to the second liquid discharge unit; detecting a movement amount error of the recording medium in the moving direction, based on the first image and the second image; and determining a discharge timing of the second liquid discharge unit with respect to discharge of the first liquid discharge unit, based on the movement amount error and a clock signal corresponding to an image forming condition. Such a liquid discharging method can provide operational effects equivalent to those of the above-described liquid discharge apparatus.

Embodiments also include a storage medium storing computer-readable program instructions. According to an embodiment of the present disclosure, for example, there is provided a non-transitory storage medium storing computer-readable program code that, when executed by a computer, causes the computer to execute a process in a liquid discharge apparatus that includes a plurality of liquid discharge units to discharge liquid to form an image on a recording medium. The plurality of liquid discharge units including a first liquid discharge unit and a second liquid discharge unit disposed downstream from the first liquid discharge unit in a moving direction of the recording medium. The process including: capturing a first image of a recording medium at a position corresponding to the first liquid discharge unit; capturing a second image of the recording medium at a position corresponding to the second liquid discharge unit; detecting a movement amount error of the recording medium in the moving direction, based on the first image and the second image; and determining a discharge timing of the second liquid discharge unit with respect to discharge of the first liquid discharge unit, based on the movement amount error and a clock signal corresponding to an image forming condition. Such a storage medium can provide operational effects equivalent to those of the above-described liquid discharge apparatus.

In addition, the numbers such as ordinal numbers and quantities used above are all examples for specifically describing the technology of the present invention, and embodiments of the present invention are not limited to the exemplified numbers. In addition, the above-describe connections among the components are examples for specifically describing the technology of the present invention, and connections for implementing functions of the present invention are not limited to the above-described examples.

The functions of the above-described embodiments may be implemented by one or a plurality of processing circuits. Here, the processing circuit or circuitry in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

The invention claimed is:

1. A liquid discharge apparatus comprising:
a plurality of liquid discharge units configured to discharge liquid to form an image on a recording medium, the plurality of liquid discharge units including: a first liquid discharge unit; and a second liquid discharge unit disposed downstream from the first liquid discharge unit in a moving direction of the recording medium;
a first image capturing unit configured to capture a first image of the recording medium at a position corresponding to the first liquid discharge unit;
a second image capturing unit configured to capture a second image of the recording medium at a position corresponding to the second liquid discharge unit;
a detection unit configured to detect a movement amount of the recording medium in the moving direction, based on the first image and the second image;
a discharge determination unit configured to determine a discharge timing of the second liquid discharge unit with respect to discharge of the first liquid discharge unit, based on the movement amount and a clock signal,
a drive roller disposed downstream from the plurality of liquid discharge units in the moving direction, the drive roller being configured to move the recording medium,
wherein the clock signal is an electric signal that regularly oscillates, and wherein a cycle of the clock signal is adjusted according to image forming conditions, and
wherein an image capturing period of the first image capturing unit is represented by the following expression, $$U \leq (\pi \times \varphi / V)/10,$$

where U represents the image capturing period, π represents a circular constant, φ represents a diameter of the drive roller, and V represents a moving speed of the recording medium.

2. The liquid discharge apparatus according to claim 1, further comprising a capturing determination unit configured to determine, based on the clock signal, a capturing timing of the second image with respect to capturing of the first image,
wherein the detection unit is configured to detect the movement amount based on the first image and the second image captured at the capturing timing.

3. The liquid discharge apparatus according to claim 1,
wherein the clock signal is a signal corresponding to an image forming condition.

4. The liquid discharge apparatus according to claim 3,
wherein the image forming condition includes at least one of a moving speed of the recording medium and a resolution of an image formed by the liquid discharge apparatus.

5. The liquid discharge apparatus according to claim 1,
wherein the recording medium is a long sheet.

6. The liquid discharge apparatus according to claim 1,
wherein the clock signal is generated by a crystal oscillator.

7. A liquid discharge method to be executed by a liquid discharge apparatus including a plurality of liquid discharge units to discharge liquid to form an image on a recording medium, the plurality of liquid discharge units including a first liquid discharge unit and a second liquid discharge unit disposed downstream from the first liquid discharge unit in a moving direction of the recording medium, the method comprising:
capturing a first image of the recording medium at a position corresponding to the first liquid discharge unit;
capturing a second image of the recording medium at a position corresponding to the second liquid discharge unit;
detecting a movement amount of the recording medium in the moving direction, based on the first image and the second image, the movement amount of the recording medium performed by a drive roller disposed downstream from the plurality of liquid discharge units in the moving direction;
determining a discharge timing of the second liquid discharge unit with respect to discharge of the first liquid discharge unit, based on the movement amount and a clock signal corresponding to an image forming condition,
wherein the clock signal is an electric signal that regularly oscillates, and wherein a cycle of the clock signal is adjusted according to image forming conditions, and
wherein an image capturing period of the first image capturing unit is represented by the following expression, $$U \leq (\pi \times \varphi / V)/10,$$

where U represents the image capturing period, π represents a circular constant, φ represents a diameter of the drive roller, and V represents a moving speed of the recording medium.

8. The liquid discharge method according to claim 7, further comprising
determining, based on the clock signal, a capturing timing of the second image with respect to capturing of the first image, and
detecting the movement amount based on the first image and the second image captured at the capturing timing.

9. The liquid discharge method according to claim 7,
wherein the clock signal is a signal corresponding to an image forming condition.

10. The liquid discharge method according to claim 7,
wherein the image forming condition includes at least one of a moving speed of the recording medium and a resolution of an image formed by the liquid discharge apparatus.

11. The liquid discharge method according to claim 7,
wherein the recording medium is a long sheet.

12. The liquid discharge method according to claim 7,
wherein the clock signal is generated by a crystal oscillator.

13. A non-transitory storage medium storing computer-readable program code that, when executed by one or more processors, causes the processors to execute a process in a liquid discharge apparatus including a plurality of liquid discharge units to discharge liquid to form an image on a recording medium, the plurality of liquid discharge units including a first liquid discharge unit and a second liquid discharge unit disposed downstream from the first liquid discharge unit in a moving direction of the recording medium, the process including:
capturing a first image of the recording medium at a position corresponding to the first liquid discharge unit;

capturing a second image of the recording medium at a position corresponding to the second liquid discharge unit;

detecting a movement amount of the recording medium in the moving direction, based on the first image and the second image, the movement amount of the recording medium performed by a drive roller disposed downstream from the plurality of liquid discharge units in the moving direction;

determining a discharge timing of the second liquid discharge unit with respect to discharge of the first liquid discharge unit, based on the movement amount and a clock signal corresponding to an image forming condition, wherein the clock signal is an electric signal that regularly oscillates, and wherein a cycle of the clock signal is adjusted according to image forming conditions, and wherein an image capturing period of the first image capturing unit is represented by the following expression, $$U \leq (\pi \times \varphi / V)/10,$$

where U represents the image capturing period, π represents a circular constant, φ represents a diameter of the drive roller, and V represents a moving speed of the recording medium.

14. The non-transitory storage medium according to claim 13, wherein the program code further causes the liquid discharge apparatus to determine, based on the clock signal, a capturing timing of the second image with respect to capturing of the first image, and detect the movement amount based on the first image and the second image captured at the capturing timing.

15. The non-transitory storage medium according to claim 13, wherein the clock signal is a signal corresponding to an image forming condition.

16. The non-transitory storage medium according to claim 13, wherein the image forming condition includes at least one of a moving speed of the recording medium and a resolution of an image formed by the liquid discharge apparatus.

17. The non-transitory storage medium according to claim 13, wherein the recording medium is a long sheet.

18. The non-transitory storage medium according to claim 13, wherein the clock signal is generated by a crystal oscillator.

* * * * *